(12) United States Patent
Amstutz et al.

(10) Patent No.: US 9,180,737 B2
(45) Date of Patent: Nov. 10, 2015

(54) MOLDED TIRE HAVING DIFFERENT TREAD MATERIAL

(71) Applicant: Caterpillar Inc., Peoria, IL (US)

(72) Inventors: Aaron K. Amstutz, Peoria, IL (US); Kevin L. Martin, Washburn, IL (US); Stephen J. Pierz, Peoria, IL (US); David J. Colantoni, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 118 days.

(21) Appl. No.: 13/865,299

(22) Filed: Apr. 18, 2013

(65) Prior Publication Data

US 2014/0311643 A1    Oct. 23, 2014

(51) Int. Cl.
| | |
|---|---|
| *B60C 7/00* | (2006.01) |
| *B60C 7/10* | (2006.01) |
| *B60C 1/00* | (2006.01) |
| *B29D 30/02* | (2006.01) |
| *B29C 70/78* | (2006.01) |
| *B29C 70/68* | (2006.01) |
| *B29K 75/00* | (2006.01) |

(52) U.S. Cl.
CPC ............. *B60C 7/105* (2013.04); *B29C 70/683* (2013.01); *B29C 70/78* (2013.01); *B29D 30/02* (2013.01); *B60C 1/0008* (2013.04); *B60C 1/0016* (2013.04); *B60C 1/0041* (2013.04); *B29K 2075/00* (2013.01); *B60C 2001/0091* (2013.04); *B60C 2007/005* (2013.04); *Y10T 152/10378* (2015.01)

(58) Field of Classification Search
CPC .............. B60C 7/00; B60C 7/08; B60C 7/10; B60C 7/102; B60C 7/105
See application file for complete search history.

(56) References Cited

U.S. PATENT DOCUMENTS

| | | | | |
|---|---|---|---|---|
| 3,713,938 | A * | 1/1973 | Sutton | 156/246 |
| 3,876,567 | A * | 4/1975 | Larkin et al. | 521/125 |
| 4,669,517 | A | 6/1987 | Krishnan | |
| 5,908,519 | A | 6/1999 | Piper et al. | |
| 6,450,222 | B1 * | 9/2002 | Fleming | 152/209.5 |
| 6,769,746 | B2 | 8/2004 | Rodgers et al. | |

FOREIGN PATENT DOCUMENTS

| | | | |
|---|---|---|---|
| EP | 159888 | * | 10/1985 |
| EP | 1 529 788 A1 | | 5/2005 |
| GB | 2012686 | * | 8/1979 |
| GB | 2035229 | * | 6/1980 |
| GB | 2047637 | * | 12/1980 |
| GB | 2183565 | * | 6/1987 |

OTHER PUBLICATIONS

Teppa, Soujanya et al., "Type Bonding Strength Modeling of Polyurethane to Vulcanized Rubber," 2009-01-0605, SAE International, Clemson University Mechanical Engineering, 2009.

* cited by examiner

*Primary Examiner* — Justin Fischer
(74) *Attorney, Agent, or Firm* — Finnegan, Henderson, Farabow, Garrett & Dunner, LLP (57) ABSTRACT

A molded tire may include a support structure having an inner circumferential portion and an outer circumferential portion. The inner circumferential portion may be configured to be associated with a hub. The molded tire may also include a tread portion associated with the outer circumferential portion of the support structure, wherein the tread portion may be formed from a first polyurethane having first material characteristics. The support structure may be formed from a second polyurethane having second material characteristics different than the first material characteristics. The support structure may be chemically bonded to the tread portion.

6 Claims, 6 Drawing Sheets

MOLDED TIRE HAVING DIFFERENT TREAD MATERIAL

TECHNICAL FIELD

The present disclosure relates to molded tires and methods for molding tires, and more particularly, to molded tires and methods for molding tires having a tread portion formed from a material different than the material forming another portion of the tire.

BACKGROUND

Tires may be formed by supplying a material in a flowable form into a mold and after the material hardens, removing the molded tire from the mold. However, it may be desirable for molded tires to have a tread portion that exhibits different material characteristics than other portions of the tire. For example, it may be desirable for the tread portion to have particular friction and wear characteristics that are different than other parts of the tire, such as the portion of the tire between the tread portion and the hub.

For example, in tires for machines it may be desirable to provide tires having a relatively stiff material able to support high loads associated with the weight of the machine and any payload. In contrast, it may be desirable for the tread portion of such a tire to be formed from a material that provides a desired level of traction and resistance to wear. However, it may be difficult to mold a tire formed from a single material that results in this combination of desirable characteristics. Attempts have been made to mold a polyurethane tread material onto a rubber tire. However, the polyurethane tread material may tend to separate from the rubber tire under certain operating conditions due, for example, to high speed, high loads, or high temperatures. As a result, it may be desirable to provide a molded tire that provides a combination of desirable stiffness, traction, and wear resistance.

An example of a method of preparing a composite of polyurethane bonded to the surface of a cured rubber substrate and the resulting composite cushioned tire is disclosed in U.S. Pat. No. 4,669,517 to Krishnan ("the '517 patent"). In particular, the method of the '517 patent requires that the rubber substrate contain an hydroxyl terminated polybutadiene polyol. The method includes first applying to a cleaned, cured rubber surface containing the polybutadiene polyol a coating of cyanuric acid followed by an additional coating of a phenol formaldehyde resin, and then applying a liquid polyurethane reaction mixture, which is cured to form the resultant composite. The method of the '517 patent is particularly directed to the preparation of a tire including a polyurethane carcass applied to a cured rubber tread, and to a tire including a polyurethane tread applied to a cured rubber carcass.

Although the method disclosed in the '517 patent purports to result in a tire including a polyurethane tread applied to a cured rubber carcass, the '517 patent does not disclose a tire or associated method that results in a molded tire having a polyurethane tread portion and a polyurethane support structure, wherein the characteristics of the polyurethane of the tread portion are different than the characteristics of the polyurethane support structure. In addition, the method of the '517 patent may be overly complex and impractical for the large scale production of molded tires.

The molded tire and associated methods disclosed herein may be directed to mitigating or overcoming one or more of the possible drawbacks set forth above.

SUMMARY

According to a first aspect, the present disclosure is directed to a molded tire. The molded tire may include a support structure having an inner circumferential portion and an outer circumferential portion. The inner circumferential portion may be configured to be associated with a hub. The molded tire may also include a tread portion associated with the outer circumferential portion of the support structure, wherein the tread portion may be formed from a first polyurethane having first material characteristics. The support structure may be formed from a second polyurethane having second material characteristics different than the first material characteristics. The support structure may be chemically bonded to the tread portion. According to some aspects, the first polyurethane may be covalently bonded to the second polyurethane.

According to a further aspect, the molded tire may include an intermediate portion coupling the tread portion and the outer circumferential portion to one another, wherein the intermediate portion is formed from a third polyurethane. For example, the support structure may be chemically bonded to the tread portion via the intermediate portion. According to another aspect, the third polyurethane may be from 50% to 90% stoichiometric prior to curing. For example, the third polyurethane may be from 60% to 80% stoichiometric prior to curing. According to yet another aspect, the intermediate portion may differ in color from at least one of the support structure and the tread portion.

According to a further aspect, the first and second polyurethanes may be substantially stoichiometric prior to curing. According to yet another aspect, the second polyurethane may be stiffer than the first polyurethane. According to still a further aspect, the first polyurethane may be more cut-resistant and have a higher coefficient of friction than the second polyurethane.

According another aspect, the molded tire may include an intermediate portion coupling the tread portion and the outer circumferential portion to one another, wherein the intermediate portion includes a semi-permeable membrane configured to permit chemical bonding between the first polyurethane and the second polyurethane. For example, the intermediate portion may include at least one of fabric and paper.

According to a further aspect, a molded tire may include a support structure having an inner circumferential portion and an outer circumferential portion. The inner circumferential portion may be configured to be associated with a hub. The molded tire may further include a tread portion coupled to the outer circumferential portion of the support structure, wherein the tread portion may be formed from a first polyurethane having first material characteristics. The support structure may be formed from a second polyurethane having second material characteristics different than the first material characteristics. The tread portion may have a Shore hardness ranging from 60 A to 60 D, and the support structure may have a Shore hardness ranging from about 80 A to about 95 A. According to another aspect, the support structure may be chemically bonded to the tread portion.

According to still another aspect, the molded tire may include an intermediate portion coupling the tread portion and the outer circumferential portion to one another, wherein the intermediate portion is formed from a third polyurethane. According to a further aspect, the molded tire may include an intermediate portion coupling the tread portion and the outer circumferential portion to one another, wherein the intermediate portion includes a semi-permeable membrane configured to permit chemical bonding between the first polyurethane and the second polyurethane.

According to another aspect, the present disclosure is directed to a method of molding a tire including a support structure and a tread portion associated with an outer circumferential portion of the support structure. The method may include providing a mold assembly for forming the tire, and supplying a first polyurethane having first material characteristics to the mold assembly to form the tread portion of the tire. The first polyurethane may be partially cured. The method may also include supplying a second polyurethane having second material characteristics to the mold assembly to form the support structure of the tire. The method may further include heating the mold assembly and the first and second polyurethanes for a sufficient time to cure the first and second polyurethanes, such that the first and second polyurethanes are chemically bonded to one another.

According to still another aspect, supplying the first polyurethane to the mold assembly may include supplying the first polyurethane to a mold for forming the tread portion and heating the mold for forming the tread portion and the first polyurethane a sufficient time to partially cure the first polyurethane. According to another aspect, the mold for forming the tread portion may be separate from the mold assembly for forming the tire, and supplying the first polyurethane to the mold assembly for forming the tire may include removing the tread portion from the mold for forming the tread portion and inserting the tread portion into the mold assembly for forming the tire.

According to a further aspect, the tread portion may include a plurality of tread portion sections, and inserting the tread portion into the mold assembly for forming the tire may include inserting each of the plurality of tread portion sections into the mold assembly for forming the tire.

According to a further aspect, the mold for forming the tread portion may include a portion of the mold assembly for forming the tire and a circular barrier positioned in the mold assembly for forming the tire. According to still a further aspect, supplying the first polyurethane to the mold assembly may include molding the tread portion in the mold for forming the tread portion and removing the circular barrier from the mold assembly for forming the tire, such that the tread portion remains in the mold assembly for forming the tire. According to another aspect, supplying the first polyurethane to the mold assembly may include supplying the first polyurethane to the mold for forming the tread portion, heating the mold for forming the tread portion and the first polyurethane to partially cure the first polyurethane, and removing tread portion and the circular barrier from the mold assembly for forming the tire.

According to yet another aspect, supplying the second polyurethane may include adding the second polyurethane to the mold assembly such that the second polyurethane is in direct contact with the first polyurethane. According to a further aspect, the method may include supplying a third polyurethane to the mold assembly to form an intermediate portion of the molded tire, wherein the third polyurethane is from 50% to 90% stoichiometric prior to being cured, and wherein the first and second polyurethanes are chemically bonded to one another via the intermediate portion.

According to another aspect, supplying the third polyurethane to the mold assembly may occur prior to supplying the first and second polyurethanes to the mold assembly. For example, supplying the third polyurethane may include molding the intermediate portion and inserting the molded intermediate portion into the mold assembly for forming the tire. According to another aspect, molding the intermediate portion may include partially curing the intermediate portion before inserting the molded intermediate portion into the mold assembly for forming the tire.

According to still another aspect, the third polyurethane may be from 60% to 80% stoichiometric prior to curing. According to a further aspect, the first and second polyurethanes may be substantially stoichiometric prior curing.

According to yet another aspect, supplying the first polyurethane may include supplying the first polyurethane adjacent an outer circumferential surface of the intermediate portion, and supplying the second polyurethane adjacent an inner circumferential surface of the intermediate portion.

According to yet another aspect, the method may include placing an intermediate portion in the mold assembly, wherein the intermediate portion has an inner circumferential surface and an outer circumferential surface. The method may further include supplying the first polyurethane to the mold assembly adjacent an outer circumferential surface of the intermediate portion to form the tread portion of the molded tire. The method may also include supplying the second polyurethane to the mold assembly adjacent an inner circumferential surface of the intermediate portion to form the support structure of the molded tire, and heating the mold assembly and the first and second polyurethanes for a sufficient time to cure the first and second polyurethanes, wherein the intermediate portion includes a semi-permeable membrane configured to permit chemical bonding between the first and second polyurethanes.

According to still another aspect, the first and second polyurethanes may be substantially stoichiometric prior curing. According to another aspect, supplying the first and second polyurethanes to the mold assembly may include supplying the first and second polyurethanes concurrently. For example, the first and second polyurethanes may be supplied concurrently, such that a fill level of the first polyurethane and a fill level of the second polyurethane are substantially equal as the first and second polyurethanes are supplied to the mold assembly. According to another aspect, the first and second polyurethanes may be supplied concurrently, such that a fill level of the second polyurethane is maintained slightly higher than a fill level of the first polyurethane.

According to yet another aspect, the intermediate portion may include at least one of fabric and paper, and placing the intermediate portion in the mold assembly may include supporting the intermediate portion via a frame structure, so that the intermediate portion substantially maintains a circular shape as the first and second polyurethanes are supplied to the mold assembly.

DETAILED DESCRIPTION

Figure 1:
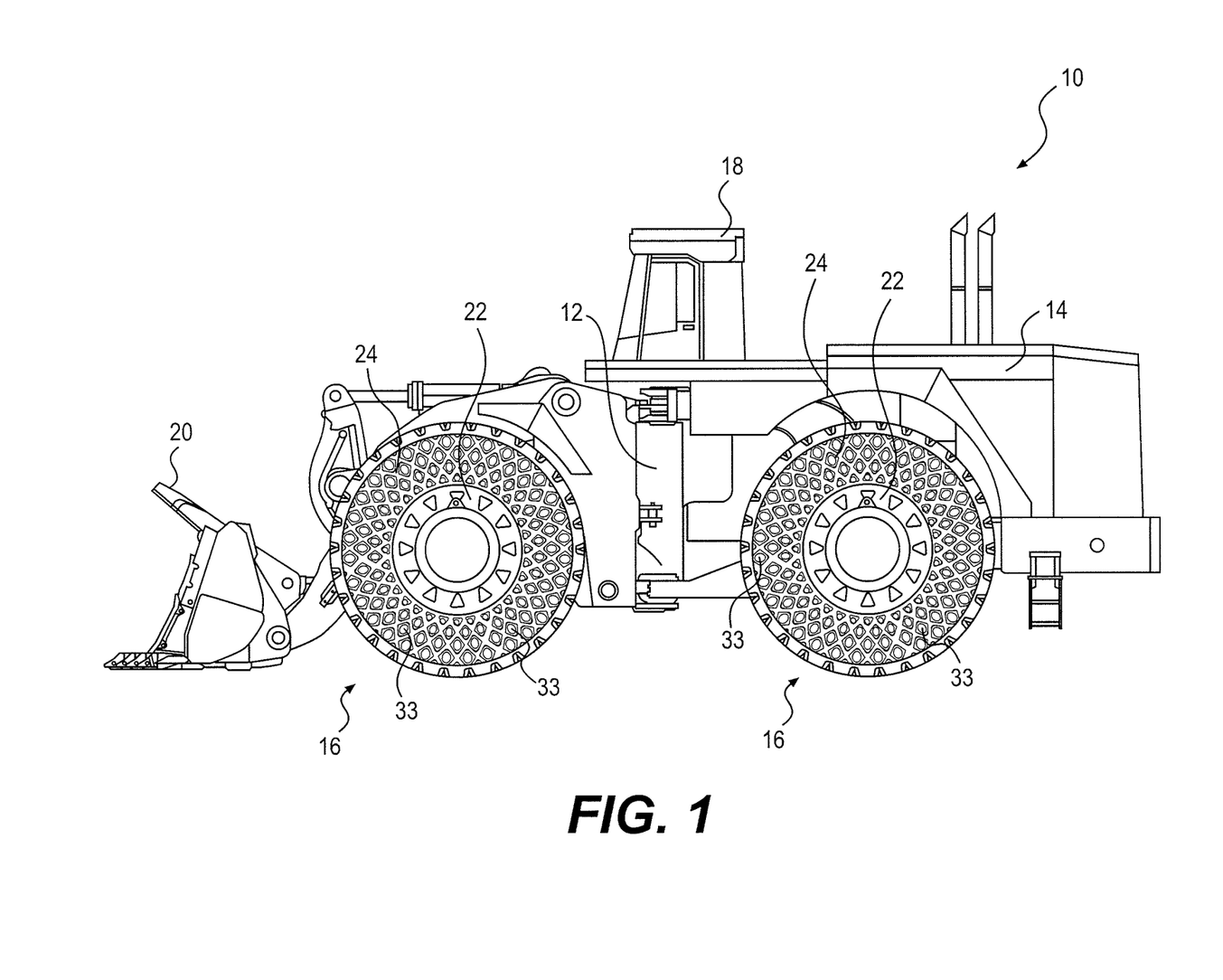
FIG. 1 is a side view of an exemplary embodiment of a machine including an exemplary embodiment of a molded tire.

FIG. 1 shows an exemplary machine 10 configured to travel across terrain. Exemplary machine 10 shown in FIG. 1 is a wheel loader. However, machine 10 may be any type of ground-borne vehicle, such as, for example, an automobile, a truck, an agricultural vehicle, and/or a construction vehicle, such as, for example, a dozer, a skid-steer loader, an excavator, a grader, an on-highway truck, an off-highway truck, and/or any other vehicle type known to a person skilled in the art. In addition to self-propelled machines, machine 10 may be any device configured to travel across terrain via assistance or propulsion from another machine.

Exemplary machine 10 shown in FIG. 1 includes a chassis 12 and a powertrain 14 coupled to and configured to supply power to wheels 16, so that machine 10 is able to travel across terrain. Machine 10 also includes an operator station 18 to provide an operator interface and protection for an operator of machine 10. Machine 10 also includes a bucket 20 configured to facilitate movement of material. As shown in FIG. 1, exemplary wheels 16 include a hub 22 coupled to powertrain 14, and tires 24 coupled to hubs 22. Exemplary tires 24 are molded tires, such as, for example, molded, non-pneumatic tires.

Figure 2:
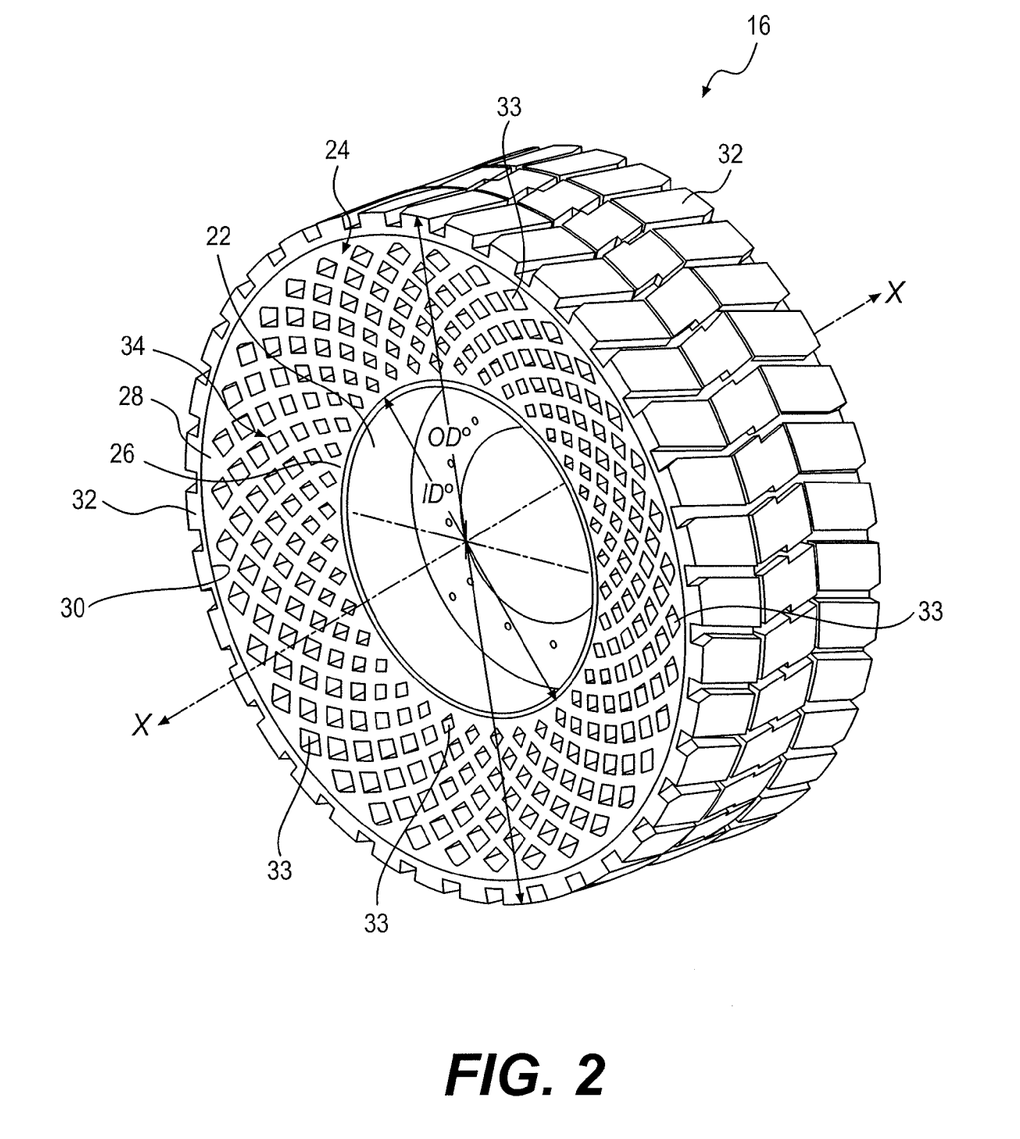
FIG. 2 is a perspective view of an exemplary embodiment of a molded tire.
Figure 3:
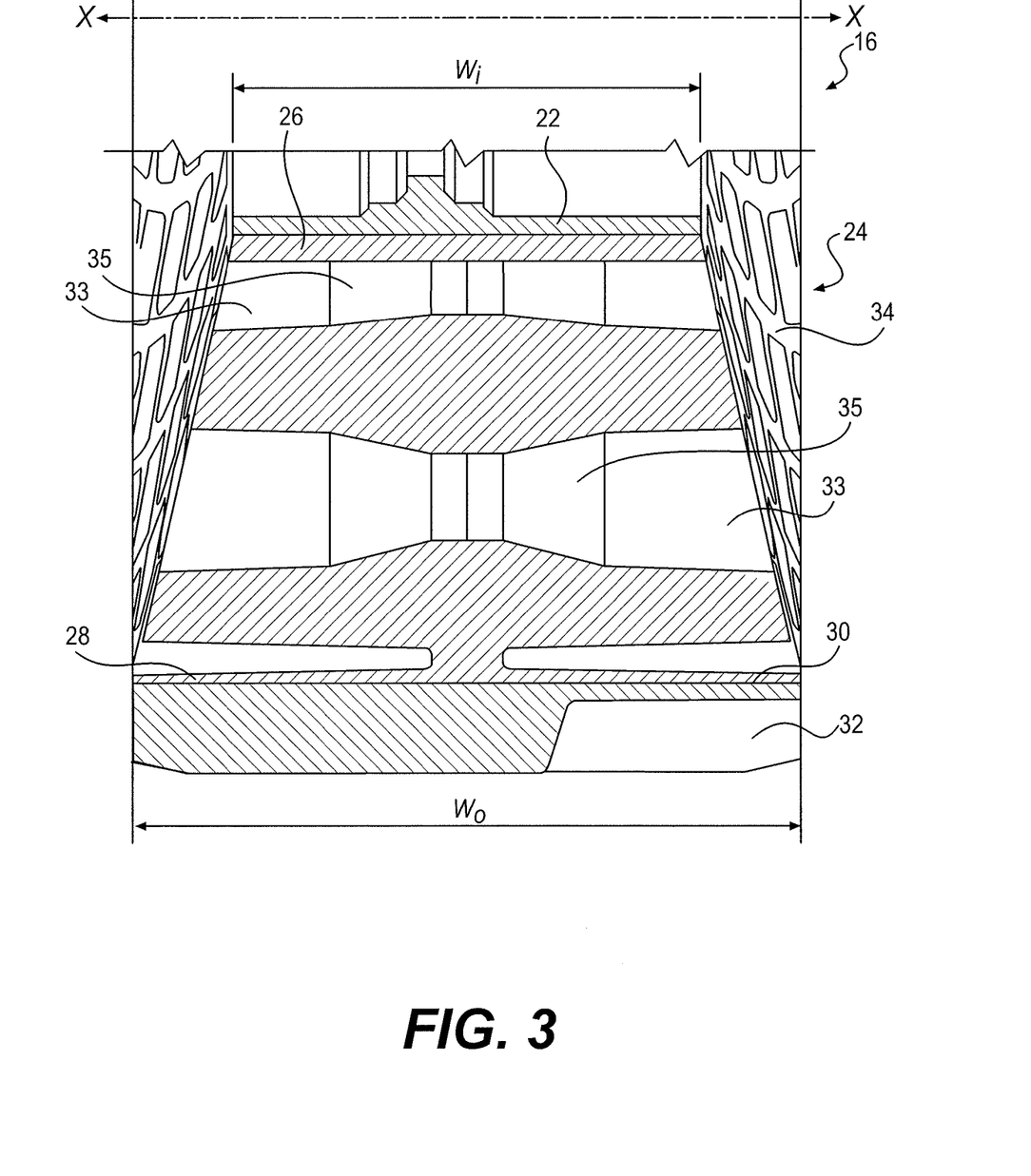
FIG. 3 is a partial section view of an exemplary embodiment of a molded tire.

The exemplary tire 24 shown in FIGS. 2 and 3 includes an inner circumferential portion 26 configured to be coupled to a hub 22, and an outer circumferential portion 28 configured to be coupled to an inner surface 30 of a tread portion 32 configured to improve traction of tire 24 at the interface between tire 24 and the terrain across which tire 24 rolls. Extending between inner circumferential portion 26 and outer circumferential portion 28 is a support structure 34. Exemplary support structure 34 serves to couple inner circumferential portion 26 and outer circumferential portion 28 to one another. As shown in FIGS. 1-4, exemplary tire 24 includes a plurality of cavities 33 configured to provide support structure 34 with a desired level of support and cushioning for tire 24. According to some embodiments, one or more of cavities 33 may have an axial intermediate region 35 having a relatively smaller cross-section than the portion of cavities 33 closer to the axial sides of tire 24.

According to some embodiments, one or more of inner circumferential portion 26 and outer circumferential portion 28 are part of support structure 34. Hub 22 and/or inner circumferential portion 26 may be configured to facilitate coupling of hub 22 to inner circumferential portion 26. According to some embodiments, support structure 34, inner circumferential portion 26, outer circumferential portion 28, and/or tread portion 32 are integrally formed as a single, monolithic piece, for example, via molding. For example, tread portion 32 and support structure 34 may be chemically bonded to one another. For example, the material of tread portion 32 and the material of support structure 34 may be covalently bonded to one another. According to some embodiments, support structure 34, inner circumferential portion 26, and/or outer circumferential portion 28 are integrally formed as a single, monolithic piece, for example, via molding, and tread portion 32 is formed separately in time and/or location and is joined to support structure 34 in a common mold assembly to form a single, monolithic piece. Even in such embodiments, tread portion 32 and support structure 34 may be chemically bonded to one another. For example, the material of tread portion 32 and the material of support structure 34 may be covalently bonded to one another.

Exemplary tire 24, including inner circumferential portion 26, outer circumferential portion 28, tread portion 32, and support structure 34, may be configured to provide a desired amount of traction and cushioning between a machine and the terrain. For example, support structure 34 may be configured to support the machine in a loaded, partially loaded, and empty condition, such that a desired amount of traction and/or cushioning is provided, regardless of the load.

For example, if the machine is a wheel loader as shown in FIG. 1, when its bucket is empty, the load on one or more of wheels 16 may range from about 60,000 lbs. to about 160,000 lbs. (e.g., 120,000 lbs.). In contrast, with the bucket loaded with material, the load on one or more of wheels 16 may range from about 200,000 lbs. to about 400,000 lbs. (e.g., 350,000 lbs.). Tire 24 may be configured to provide a desired level of traction and cushioning, regardless of whether the bucket is loaded, partially loaded, or empty. For smaller machines, correspondingly lower loads are contemplated. For example, for a skid-steer loader, the load on one or more of wheels 16 may range from about 1,000 lbs. empty to about 3,000 lbs. (e.g., 2,400 lbs.) loaded.

Tire 24 may have dimensions tailored to the desired performance characteristics based on the expected use of the tire. For example, exemplary tire 24 may have an inner diameter ID for coupling with hub 22 ranging from 0.5 meter to 4 meters (e.g., 2 meters), and an outer diameter OD ranging from 0.75 meter to 6 meters (e.g., 4 meters) (see FIG. 2). According to some embodiments, the ratio of the inner diameter of tire 24 to the outer diameter of tire 24 ranges from 0.25:1 to 0.75:1, or 0.4:1 to 0.6:1, for example, about 0.5:1. Support structure 34 may have an inner axial width $W_i$ at inner circumferential barrier 26 (see FIGS. 3 and 4) ranging from 0.05 meter to 3 meters (e.g., 0.8 meter), and an outer axial width $W_o$ at outer circumferential portion 28 ranging from 0.1 meter to 4 meters (e.g., 1 meter). For example, exemplary tire 24 may have a trapezoidal cross-section (see FIG. 3). Other dimensions are contemplated. For example, for smaller machines, correspondingly smaller dimensions are contemplated.

According to some embodiments, tread portion 32 is formed from a first polyurethane having first material characteristics, and support structure 34 is formed from a second polyurethane having second material characteristics different than the first material characteristics. According to some embodiments, tread portion 32 is chemically bonded to support structure 34. For example, at least some of the first polyurethane of tread portion 32 is covalently bonded to at least some of the second polyurethane of support structure 34. This may result in a superior bond than bonds formed via adhesives, mechanisms, or fasteners.

As a result of the first material characteristics of the first polyurethane being different than the second material characteristics of the second polyurethane, it may be possible to tailor the characteristics of tread portion 32 and support structure 34 to characteristics desired for those respective portions of tire 24. For example, the second polyurethane of support structure 34 may be selected to be relatively stiffer and/or stronger than the first polyurethane of tread portion 32, so that support structure 34 may have sufficient stiffness and strength to support the anticipated load on tires 24. According to some embodiments, the first polyurethane of tread portion 32 may be selected to be relatively more cut-resistant and wear-resistant and/or have a higher coefficient of friction than the second polyurethane, so that regardless of the second polyurethane selected for support structure 34, tread portion 32 may provide the desired wear and/or traction characteristics for tire 24.

For example, the first polyurethane of tread portion 32 may include polyurethane urea materials based on one or more of polyester, polycaprolactone, and polycarbonate polyols that may provide relatively enhanced abrasion resistance. Such polyurethane urea materials may include polyurethane prepolymer capped with methylene diisocyanate (MDI) that may relatively strongly phase segregate and form materials with relatively enhanced crack propagation resistance. Alternative polyurethanes capped with toluene diisocyanate (TDI), napthalene diisocyanate (NDI), and/or para-phenylene diisocyanate (PPDI) may also be used. Such polyurethane prepolymer materials may be cured with aromatic diamines that may also encourage strong phase segregation. Exemplary aromatic diamines include methylene diphenyl diamine (MDA) that may be bound in a salt complex such as tris (4,4'-diamino-diphenyl methane) sodium chloride (TDDM).

According to some embodiments, the first polyurethane may have a Shore hardness ranging from about from 60 A to about 60 D (e.g., 85 Shore A). For certain applications, such as those with soft ground conditions, it may be beneficial to form tread portion 32 from a material having a relatively harder durometer to generate sufficient traction through tread penetration. For applications such as those with hard or rocky ground conditions, it may be beneficial to form tread portion 32 from a material having a relatively lower durometer to allow conformability of tread portion 32 around hard rocks.

According to some embodiments, the second polyurethane of support structure 34 may include polyurethane urea materials based on one or more of polyether, polycaprolactone, and polycarbonate polyols that may provide relatively enhanced fatigue strength and/or a relatively low heat build up (e.g., a low tan δ). For example, for high humidity environments it may be beneficial for the second polyurethane to provide a low tan δ for desired functioning of the tire after moisture absorption. Such polyurethane urea materials may include polyurethane prepolymer capped with methylene diisocyanate (MDI) that may strongly phase segregate and form materials having relatively enhanced crack propagation resistance, which may improve fatigue strength. Alternative polyurethanes capped with toluene diisocyanate (TDI), napthalene diisocyanate (NDI), or para-phenylene diisocyanate (PPDI) may also be used. Such polyurethane prepolymer materials may be cured with aromatic diamines that may also encourage strong phase segregation. Exemplary aromatic diamines include methylene diphenyl diamine (MDA) that may be bound in a salt complex such as tris (4,4'-diamino-diphenyl methane) sodium chloride (TDDM). Chemical crosslinking in the polyurethane urea may provide improved resilience to support structure 34. Such chemical crosslinking may be achieved by any means known in the art, including but not limited to: the use of tri-functional or higher functionality prepolymers, chain extenders, or curatives; mixing with low curative stoichiometry to encourage biuret, allophanate, or isocyanate formation; including prepolymer with secondary functionality that may be cross-linked by other chemistries (e.g., by incorporating polybutadiene diol in the prepolymer and subsequently curing such with sulfur or peroxide crosslinking). According to some embodiments, the second polyurethane of support structure 34 (e.g., a polyurethane urea) may have a Shore hardness ranging from about 80 A to about 95 A (e.g., 92 A).

Figure 4:
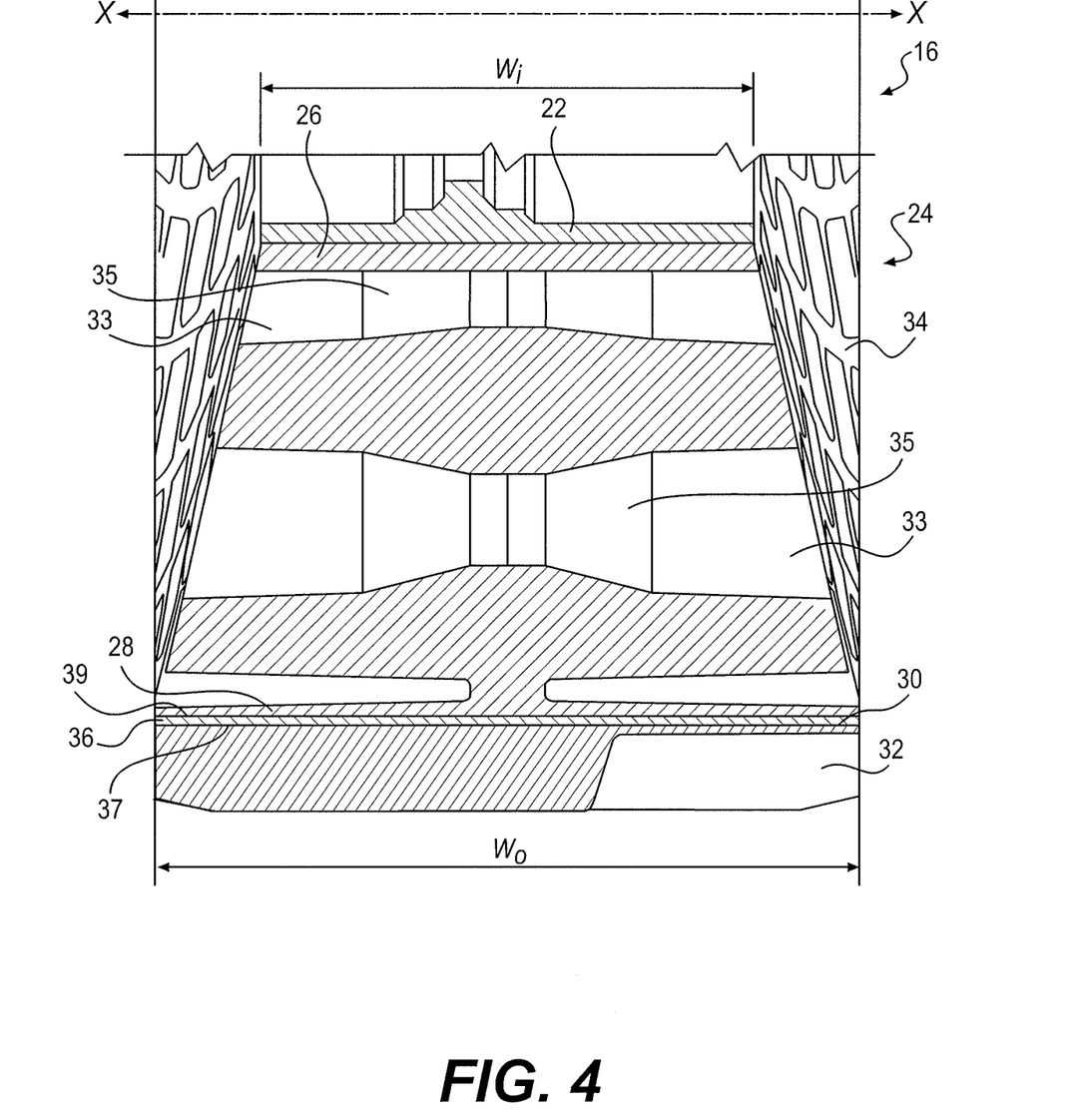
FIG. 4 is a partial section view of another exemplary embodiment of a molded tire.

As shown in FIG. 4, some embodiments of tire 24 may include an intermediate portion 36 between outer circumferential portion 28 and inner surface 30 of tread portion 32. For example, in the exemplary embodiment shown in FIG. 4, outer circumferential portion 28 of support structure 34 may be chemically bonded to inner surface 30 of tread portion 32 via intermediate portion 36 as explained in more detail below. For example, intermediate portion 36 may have an outer circumferential surface 37 chemically bonded to inner surface 30 of tread portion 32, and an inner circumferential surface 39 chemically bonded to outer circumferential portion 28 of support structure 34.

According to some embodiments, intermediate portion 36 may be formed from a third polyurethane. According to some embodiments, the third polyurethane may be at least similar (e.g., the same) chemically to either the first polyurethane or the second polyurethane. According to some embodiments, the third polyurethane may be chemically different than the first and second polyurethanes. For example, according to some embodiments, the third polyurethane may be mixed with a stoichiometry that is prepolymer rich (e.g., isocyanate rich). That is, in a polyurethane urea system there is a theoretical point where each isocyanate group will react with each curative (amine) functional group. Such a point would be considered to correspond to a stoichiometry of 100%. In a case where excess curative (diamine) is added, the stoichiometry would be considered to be greater than 100%. In a case where less curative (diamine) is added, the stoichiometry would be considered to be less than 100%. For example, if a part is formed with a stoichiometry less than 100%, there will be excess isocyanate functionality remaining in the part. Upon high temperature postcuring of such a part (e.g., subjecting the part to a second heating cycle following an initial, incomplete curing), the excess isocyanate groups will react to form urea linkages, biuret linkages, and isocyanurates through cyclo-trimerization, or crosslinks through allophanate formation. According to some embodiments, the third polyurethane may be chemically similar to the support structure 34 polyurethane, but formulated to range from about 50% to about 90% of theoretical stoichiometry (i.e., from about 50% to about 90% "stoichiometric") (e.g., from about 60% to about 80% stoichiometric (e.g., about 75% stoichiometric)). Such polyurethane urea, even after forming an initial structure following so-called "green curing," is still chemically active through the excess isocyanate functional groups.

In such embodiments, the third polyurethane may be molded into a self-supporting shape and thereafter continue to maintain its ability to chemically react or bond with the first and second polyurethanes, even if the first and second polyurethanes are substantially stoichiometric, by postcuring the first, second, and third polyurethanes together, for example, at a temperature of greater than at least about 150° C. (e.g., greater than at least about 160° C.) for a duration ranging from about 6 hours to about 18 hours (e.g., from 8 hours to 16 hours). As explained in more detail herein, a self-supporting intermediate portion 36 of third polyurethane may be inserted into a mold for forming tire 24, and the first and second polyurethanes may be supplied to the mold on either side of intermediate portion 36, such that intermediate portion 36 is embedded in tire 24 between tread portion 32 and support structure 34. According to some embodiments, the first and second polyurethanes are substantially stoichiometric prior to curing (e.g., from about 95% to about 98% stoichiometric).

According to some embodiments, intermediate portion 36 may have a different color than one or more of tread portion 32 and support structure 34. This may provide a visual indicator of the wear of tread portion 32. This may also provide a visual indicator when shaving or milling tread portion 32 during a process of retreading tire 24 with a new tread portion. For example, when tread portion 32 becomes undesirably worn, the remaining material of tread portion 32 may be shaved or milled off down to intermediate portion 36, so that a new tread portion can be molded onto intermediate portion 36 of tire 24. By virtue of intermediate portion 36 being a different color than tread portion 32, it may be relatively easier to determine when sufficient shaving or milling has occurred to expose intermediate portion 36.

According to some embodiments, intermediate portion 36 may include a semi-permeable membrane configured to permit chemical bonding between the first polyurethane and the second polyurethane. For example, the first polyurethane and the second polyurethane may be covalently bonded to one another via (e.g., through) the semi-permeable membrane. For example, intermediate portion 36 may include at least one of fabric and paper, such as, for example, flexible filter paper (e.g., a phenolic-impregnated filter paper) or an elastic fabric such as, for example, SPANDEX®. As explained in more detail herein, the fabric or paper may be supported in a mold for forming tire 24 via a frame such as spring-wire cage, and the first and second polyurethanes may be supplied to the mold on either side of the fabric or paper of intermediate portion 36, such that intermediate portion 36 is embedded in tire 24 between tread portion 32 and support structure 34.

Figure 5:
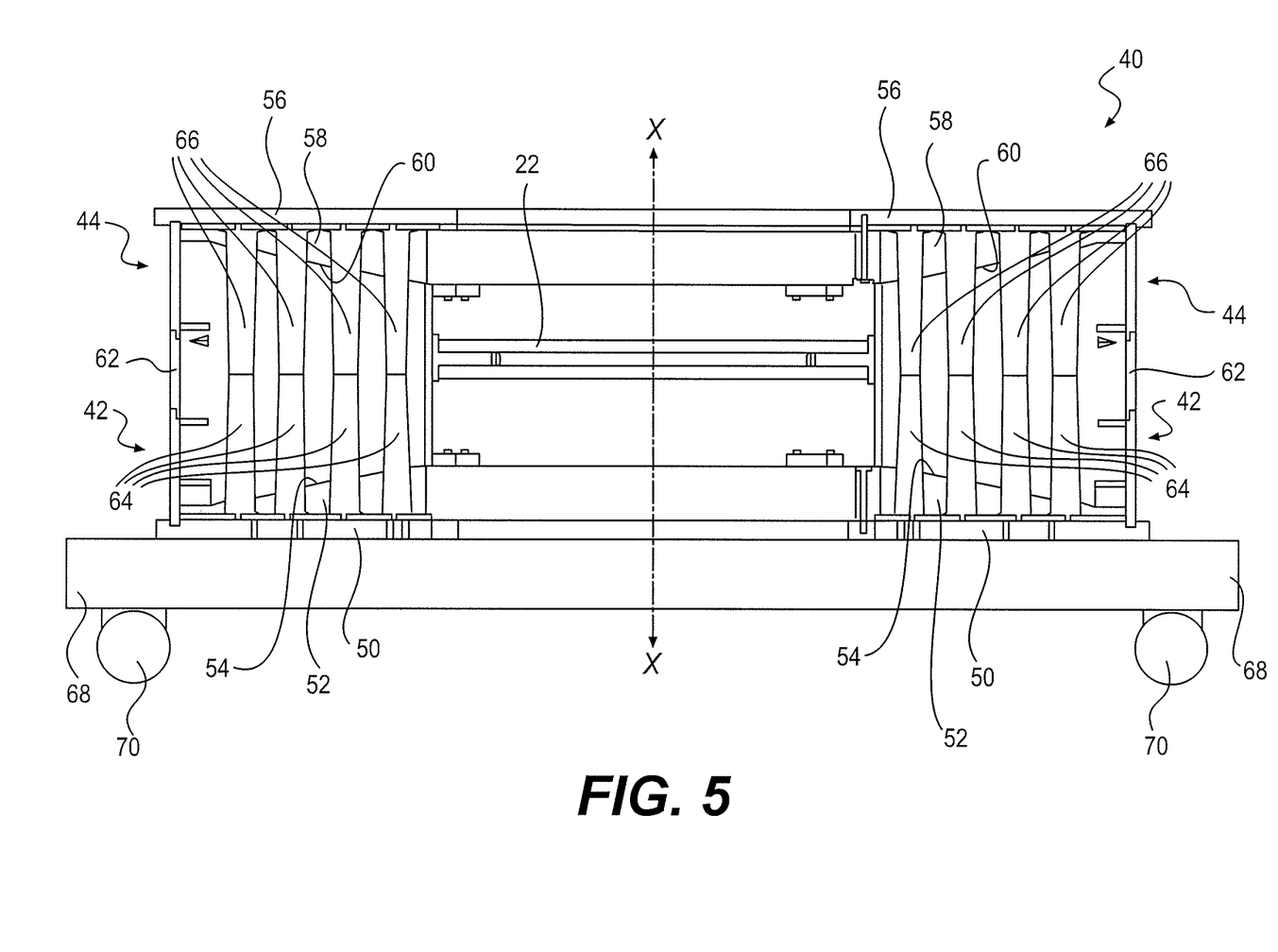
FIG. 5 is a cross-sectional side view of an exemplary embodiment of a mold assembly for molding a tire.

As shown in FIG. 5, tire 24 may be formed in a mold assembly 40 for molding tires 24, for example, exemplary tires 24 shown in FIGS. 1-4. In the exemplary embodiment shown in FIG. 5, mold assembly 40 includes a lower mold portion 42 and an upper mold portion 44 mounted on lower mold portion 42, such that hub 22 associated with molded tire 24 is received between lower mold portion 42 and upper mold portion 44. According to some embodiments, lower mold portion 42 and upper mold portion 44 may be formed primarily from metallic materials, such as, for example, steel, stainless steel, and aluminum, which may provide good heat transfer to and from the molding material during curing and cooling. In the exemplary embodiment shown in FIG. 5, the combination of lower mold portion 42, upper mold portion 44, and hub 22 form mold assembly 40, which defines a sealed interior configured to receive molding materials, such as the first and second polyurethanes of respective tread portion 32 and support structure 34. According to some embodiments, upon receipt of the molding materials, hub 22 is molded into tire 24.

As shown in FIG. 5, exemplary lower mold portion 42 includes a lower backing plate 50. According to some embodiments, lower backing plate 50 may be formed by one or more sections forming an annular lower surface of mold assembly 40. Exemplary mold assembly 40 also includes a lower relief plate 52 coupled to lower backing plate 50. Lower relief plate 52 may be configured to provide a lower relief 54 corresponding to a side of tire 24 being molded. Similarly, exemplary upper mold portion 44 includes an upper backing plate 56. According to some embodiments, upper backing plate 56 may be formed by one or more sections forming an annular upper surface of mold assembly 40. Exemplary mold assembly 40 also includes an upper relief plate 58 coupled to upper backing plate 56. Upper relief plate 58 may be configured to provide an upper relief 60 corresponding to a second side of tire 24 being molded. Lower backing plate 50, lower relief plate 52, upper backing plate 56, and/or upper relief plate 58 may be formed from a material having a high thermal conductivity, such as, for example, steel, stainless steel, or aluminum, which will facilitate heating and cooling of the molding material in the interior of mold assembly 40.

As shown in FIG. 5, lower relief 54 and upper relief 60 may be configured such that the cross-section of tire 24 molded in mold assembly 40 increases with the radius of the tire. For example, the cross-section of tire 24 may be wider adjacent tread portion 32 than adjacent hub 22. For example, as shown in FIGS. 3 and 4, the cross-section may have a substantially trapezoidal shape (i.e., FIGS. 3 and 4 show that half the cross-section has a trapezoidal shape). It is contemplated that the cross-section may have other shapes, such as, for example, concave, convex, and parallelogram shapes.

As shown in FIG. 5, exemplary mold assembly 40 includes a circular barrier 62 coupled to lower backing plate 50 and upper backing plate 56. Exemplary circular barrier 62 is substantially perpendicular to lower backing plate 50 and may correspond to a portion of an outer circumferential surface of tread portion 32 of tire 24 during molding.

In the exemplary embodiment shown in FIG. 5, lower mold portion 42 also includes a plurality of lower projections 64 that are coupled to and extend from lower backing plate 50 toward upper mold portion 44. According to some embodiments, lower projections 64 taper as they extend from lower backing plate 50. According to some embodiments, lower projections 64 are tapered rods, which may be formed from, for example, a metallic material such as steel, stainless steel, or aluminum. Lower projections 64 may be coupled to lower backing plate 50 via mechanical fasteners and/or adhesives. According to some embodiments, lower projections 64 may be coupled to lower backing plate 50 either directly or via lower relief plate 52.

According to some embodiments, as a result of lower projections 64 being tapered, cavities 33 formed in tire 24 are tapered, for example, as shown in FIGS. 3 and 4, such that they have a smaller cross-section at axially intermediate region 35 than at the outer sides of tire 14. This may facilitate removing tire 14 from mold assembly 40 following molding and/or may provide desired performance characteristics of the tire. As shown in FIG. 5, some embodiments of lower mold portion 42 are configured to receive hub 22. In the exemplary embodiment shown, lower projections 64 are arranged around hub 22 in a number of concentric circles (see FIGS. 1 and 2, which show cavities 33 arranged in concentric circles).

As shown in FIG. 5, upper mold portion 44 includes a plurality of upper projections 66 that are coupled to and extend from upper backing plate 56 toward lower mold portion 42. According to some embodiments, upper projections 66 taper as they extend from upper backing plate 56. According to some embodiments, upper projections 66 are tapered rods, which may be formed from, for example, a metallic material such as steel, stainless steel, or aluminum. Upper projections 66 may be coupled to upper backing plate 56 via mechanical fasteners and/or adhesives. According to some embodiments, upper projections 66 may be coupled to upper backing plate 56 either directly or via upper relief plate 58.

In the exemplary embodiment shown, external surfaces of upper projections 66 are tapered as they extend from upper backing plate 56. As a result, cavities 33 formed in tire 24 are tapered, for example, as shown in FIGS. 3 and 4, such that they have a smaller cross-section at axially intermediate region 35 than at the outer sides of tire 24. This may facilitate removing tire 24 from mold assembly 40 following molding and/or may provide desired performance characteristics of tire 24. As shown in FIG. 5, some embodiments of upper mold portion 44 are configured to receive hub 22. In the exemplary embodiment shown, upper projections 66 are arranged around hub 22 in a number of concentric circles.

As shown in FIG. 5, lower mold portion 42 may be placed on a platform 68. Platform 68 may include rollers 70 (e.g., wheels) configured to facilitate movement of mold assembly 40 during use, for example, in order to move mold assembly 40 into and out of an oven for curing the polyurethane of the molded tire.

Figure 6:
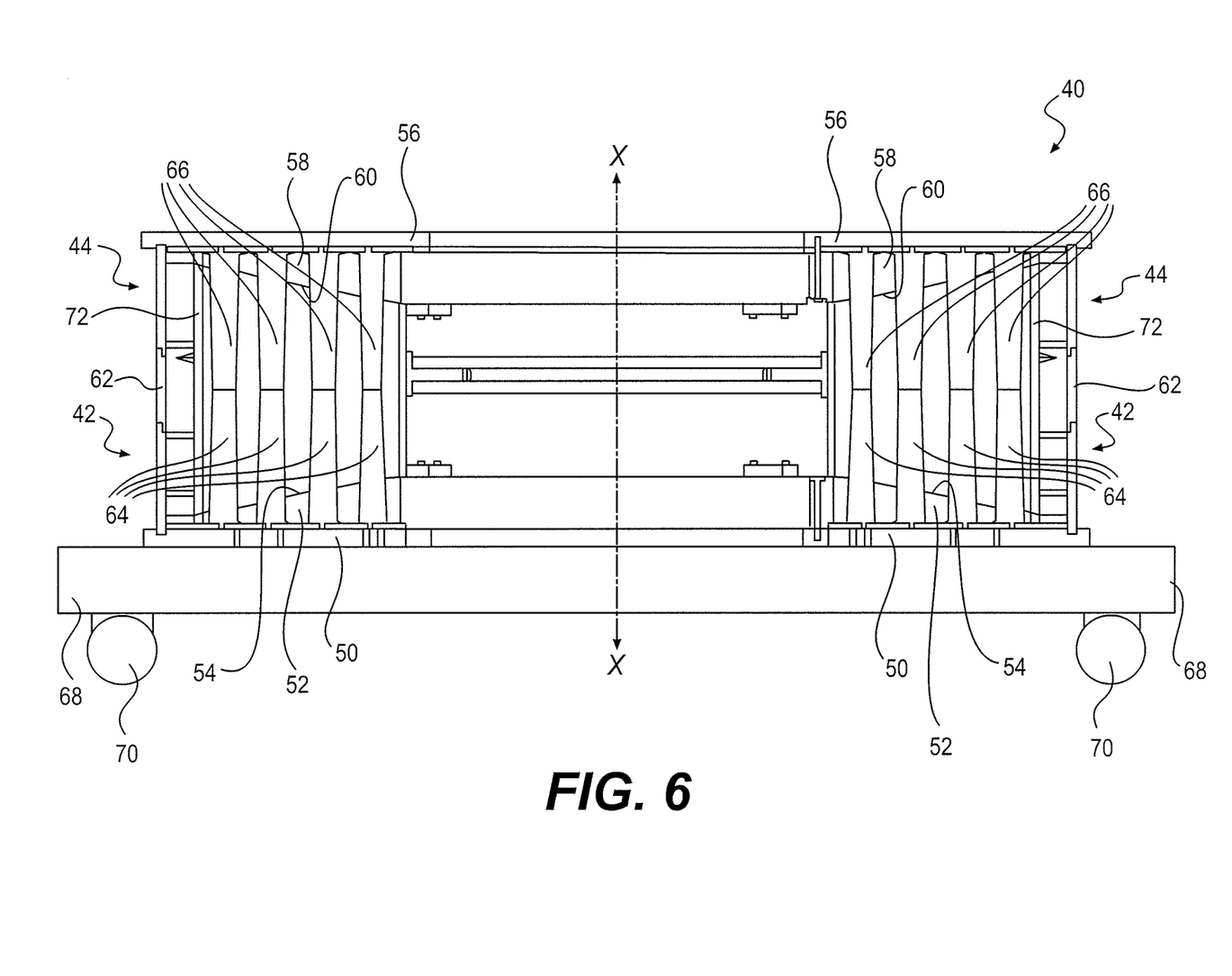
FIG. 6 is a cross-sectional side view of another exemplary embodiment of a mold assembly for molding a tire.

As shown in FIG. 6, some embodiments of mold assembly 40 may be configured to receive an intermediate circular barrier 72. Intermediate circular barrier 72 may be inserted into the interior of mold assembly 40 to form tread portion 32. For example, intermediate circular barrier 72 may be inserted into mold assembly 40 to form an annular space corresponding to tread portion 32, and the first polyurethane of tread portion 32 may be supplied to the space formed between circular barrier 62 and intermediate circular barrier 72. Thereafter, the first polyurethane may be partially cured by heating for a predetermined time and temperature, so that the first polyurethane forming tread portion 32 remains partially reactive with a subsequently-supplied polyurethane. For example, for polyurethane urea systems using TDDM curative, this may be a temperature ranging from about 110° C. to about 150° C. for a duration ranging from about 2 hours to about 6 hours (e.g., at 130° C. for 4 hours). Thereafter, intermediate circular barrier 72 may be removed from mold assembly 40, and the partially-cured tread portion 32 may either (1) remain in mold assembly 40 for subsequent molding with the second polyurethane of support structure 34, or (2) be removed from mold assembly 40 to be molded with a support structure at a later time. According to some embodiments, the partially-cured tread portion 32 may be substantially self-supporting, so that it may be returned to mold assembly 40 for molding with support structure 34. According to some embodiments, intermediate circular barrier 72 may be formed from a metallic material such as steel, stainless steel, or aluminum, to promote heat transfer and separation from the first polyurethane following molding of tread portion 32.

Exemplary mold assemblies 40 shown in FIGS. 5 and 6 may be used to form molded, non-pneumatic tires, such as, for example, the exemplary tires 24 shown in FIGS. 1-4, according to a number of methods. For example, exemplary mold assemblies 40 may be used to mold a tire including support structure 34 and tread portion 32 associated with an outer circumferential portion 28 of support structure 34. The exemplary methods may include supplying the first polyurethane having first material characteristics to mold assembly 40 to form tread portion 32. According to some embodiments, the first polyurethane may be partially cured. The method may further include supplying the second polyurethane having second material characteristics to mold assembly 40 to form support structure 34 of tire 24, and heating mold assembly 40 and the first and second polyurethanes for a sufficient time and temperature to cure the first and second polyurethanes, such that the first and second polyurethanes are chemically bonded (e.g., covalently bonded) to one another. For example, for polyurethane urea systems using TDDM as a curative, for a complete cure the temperature may range from about 120° C. to about 160° C. for a duration ranging from about 6 hours to about 48 hours (e.g., at 140° C. for 24 hours). With tread portion 32 and support structure 34 of the resulting tire being chemically bonded to one another, the likelihood that tread portion 32 and support structure 34 become separated from one another during use may be reduced.

According to some embodiments, supplying the first polyurethane to mold assembly 40 includes supplying the first polyurethane to a mold for forming tread portion 32 and heating the mold and the first polyurethane for a sufficient time and temperature to partially cure the first polyurethane. For example, for polyurethane urea systems using TDDM curative, this may be a temperature ranging from about 110° C. to about 150° C. for a duration ranging from about 2 hours to about 6 hours (e.g., at 130° C. for 4 hours). According to some embodiments, the mold for forming tread portion 32 is separate from mold assembly 40 for forming the tire, and supplying the first polyurethane to mold assembly 40 for forming the tire includes removing the partially-cured tread portion 32 from the mold for forming the tread portion and inserting the partially-cured tread portion 32 into mold assembly 40 for forming the tire. This exemplary method makes it possible to form a number of tread portions 32 separately from mold assembly 40 and store them prior to placing the pre-formed, partially cured tread portions 32 into mold assembly 40 for being joined to support structure 34 during molding of support structure 34.

For example, after the pre-formed tread portion 32 is inserted into mold assembly 40, the second polyurethane of support structure 34 may be supplied to mold assembly 40, so that the second polyurethane is retained by inner surface 30 of tread portion 32 (i.e., the second polyurethane is in direct contact with the partially-cured first polyurethane that forms the pre-formed tread portion 32). Following the supply of the second polyurethane to mold assembly 40, mold assembly 40 and the first and second polyurethanes may be heated (e.g., in an oven) for a sufficient time and temperature to cure the first and second polyurethanes, such that the first and second polyurethanes are chemically bonded (e.g., covalently bonded) to one another. For example, for polyurethane urea systems using TDDM as a curative, for a complete cure the temperature may range from about 120° C. to about 160° C. for a duration ranging from about 6 hours to about 48 hours (e.g., at 140° C. for 24 hours).

According to some embodiments, the pre-formed tread portion 32 includes a plurality of tread portion sections, and inserting the pre-formed tread portion 32 into mold assembly 40 includes inserting each of the plurality of tread portion sections into mold assembly 40 for forming the tire. This may facilitate the use of relatively smaller molds to form the tread portion sections.

According to some embodiments, for example, as shown in FIG. 6, the mold for forming tread portion 32 includes a portion of mold assembly 40 and intermediate circular barrier 72 positioned in mold assembly 40. For example, intermediate circular barrier 72 may be inserted into mold assembly 40 to form an annular tread mold between circular barrier 62 and intermediate circular barrier 72. For such embodiments, supplying the first polyurethane to mold assembly 40 includes molding tread portion 32 in the mold between circular barrier 62 and intermediate circular barrier 72, and thereafter heating mold assembly 40 and the first polyurethane for a sufficient time and temperature to partially cure the first polyurethane. For example, for polyurethane urea systems using TDDM curative, this may be a temperature ranging from about 110° C. to about 150° C. for a duration ranging from about 2 hours to about 6 hours (e.g., at 130° C. for 4 hours). After the first polyurethane has been partially cured, the intermediate circular barrier 72 may be removed from mold assembly 40, such that the pre-formed tread portion 32 remains in mold assembly 40. Thereafter, the second polyurethane of support structure 34 may be supplied to mold assembly 40, so that the second polyurethane is retained by inner surface 30 of tread portion 32 (i.e., the second polyurethane is in direct contact with the partially-cured first polyurethane that forms the pre-formed tread portion 32). Following the supply of the second polyurethane to mold assembly 40, mold assembly 40 and the first and second polyurethanes may be heated (e.g., in an oven) for a sufficient time and temperature to cure the first and second polyurethanes, such that the first and second polyurethanes are chemically bonded (e.g., covalently bonded) to one another. For example, for polyurethane urea systems using TDDM as a curative, for a complete cure the temperature may range from about 120° C. to about 160° C. for a duration ranging from about 6 hours to about 48 hours (e.g., at 140° C. for 24 hours).

According to some embodiments, the partially-cured tread portion 32 may be removed from mold assembly 40 with (or after) intermediate circular barrier 72 is removed from mold assembly 40, and prior to supplying the second polyurethane to mold assembly 40. This may facilitate forming one or more additional partially-cured tread portions 32 in mold assembly 40 before molding support structure 34 in mold assembly 40.

According to some embodiments, the method of molding tire 24 also includes supplying a third polyurethane to mold assembly 40 to form intermediate portion 36 (see, e.g., FIG. 4) of the molded tire. According to some embodiments, the third polyurethane is formulated to be from about 50% to about 90% of the theoretical ideal stoichiometry (e.g., from 60% to 80% stoichiometric) prior to being cured.

According to some embodiments, supplying the third polyurethane to mold assembly includes molding intermediate portion 36 in a separate mold, and thereafter inserting the pre-molded intermediate portion 36 into mold assembly 40. For example, intermediate portion 36 may be formed by supplying the third polyurethane to the separate mold and heating the separate mold and third polyurethane for a sufficient time and temperature to partially cure the third polyurethane. For example, for polyurethane urea systems using TDDM curative, this may be a temperature ranging from about 110° C. to about 150° C. for a duration ranging from about 1 hour to about 4 hours (e.g., at 130° C. for 2 hours). This heating duration for partial curing may be shorter than that of tread portion 32 because intermediate portion 36 may have a relatively thinner cross-section than the cross-section of tread portion 32. Once partially cured, intermediate portion 36 may be de-molded and placed into mold assembly 40 prior to supplying the first and second polyurethanes to mold assembly 40. According to some embodiments, the partially-cured intermediate portion may be substantially self-supporting so that it generally holds its shape when placed in mold assembly 40.

Following insertion of intermediate portion 36 into mold assembly 40, the first and second polyurethanes may be supplied to mold assembly 40, such that the first polyurethane is adjacent (e.g., in contact with) outer circumferential surface 37 of intermediate portion 36, and the second polyurethane is adjacent (e.g., in contact with) inner circumferential surface 39 of intermediate portion 36. After addition of the first and second polyurethanes to mold assembly 40, mold assembly 40 and the first, second, and third polyurethanes may be heated for a sufficient time and temperature to cure the first, second, and third polyurethanes, such that the first and second polyurethanes are chemically bonded to one another via the third polyurethane of intermediate portion 36, for example, via covalent bonds between the first polyurethane and the third polyurethane and covalent bonds the between the second polyurethane and the third polyurethane. For example, for polyurethane urea systems using TDDM as a curative, for a complete cure the temperature may range from about 120° C. to about 160° C. for a duration ranging from about 6 hours to about 48 hours (e.g., at 140° C. for 24 hours). With tread portion 32 and support structure 34 of the resulting tire being chemically bonded to one another, the likelihood that tread portion 32 and support structure 34 become separated from one another during use may be reduced. According to some such embodiments, the first and second polyurethanes are substantially stoichiometric prior curing.

According to some embodiments, supplying the first and second polyurethanes to mold assembly 40 on either side of intermediate portion 36 includes supplying the first and second polyurethanes concurrently. For example, the first and second polyurethanes may be supplied such that a fill level of the first polyurethane and a fill level of the second polyurethane remain substantially equal as the first and second polyurethanes are supplied to mold assembly 40. According to some embodiments, the first and second polyurethanes are supplied concurrently, such that the fill level of the second polyurethane is maintained slightly higher than the fill level of the first polyurethane. This may prevent or reduce the likelihood of intermediate portion 36 deforming in a manner that would result in an undesirable distribution of the first and second polyurethanes in mold assembly 40.

According to some embodiments, intermediate portion 36 is not formed from polyurethane. For example, intermediate portion 36 may include a semi-permeable membrane configured to permit chemical bonding between the first and second polyurethanes through the semi-permeable membrane, for example, covalent bonding between the first and second polyurethanes via (e.g., through) the semi-permeable membrane. For example, the method may include placing intermediate portion 36 including the semi-permeable membrane in mold assembly 40, wherein the semi-permeable membrane has an inner circumferential surface 39 and an outer circumferential surface 37 (see, e.g., FIG. 4). The method may further include supplying the first polyurethane to mold assembly 40 adjacent outer circumferential surface 37 of intermediate portion 36 to form tread portion 32 of the molded tire, and supplying the second polyurethane to mold assembly 36 adjacent inner circumferential surface 39 of intermediate portion 36 to form support structure 34 of the molded tire. Thereafter, mold assembly 40 and the first and second polyurethanes may be heated for a sufficient time and temperature to cure the first and second polyurethanes, such that the first and second polyurethanes are chemically bonded to one another via the semi-permeable membrane of intermediate portion 36. For example, for polyurethane urea systems using TDDM as a curative, for a complete cure the temperature may range from about 120° C. to about 160° C. for a duration ranging from about 6 hours to about 48 hours (e.g., at 140° C. for 24 hours). With tread portion 32 and support structure 34 of the resulting tire being chemically bonded to one another, the likelihood that tread portion 32 and support structure 34 become separated from one another during use may be reduced. According to some such embodiments, the first and second polyurethanes are substantially stoichiometric prior to curing.

According to some embodiments including a semi-permeable membrane, the first and second polyurethanes are supplied to mold assembly 40 concurrently. For example, the first and second polyurethanes may be supplied such that a fill level of the first polyurethane and a fill level of the second polyurethane remain substantially equal as the first and second polyurethanes are supplied to mold assembly 40 on either side of the semi-permeable membrane of intermediate portion 36. According to some embodiments, the first and second polyurethanes are supplied concurrently, such that the fill level of the second polyurethane is maintained slightly higher than the fill level of the first polyurethane. This may prevent or reduce the likelihood of the semi-permeable membrane of intermediate portion 36 deforming in a manner that would result in an undesirable distribution of the first and second polyurethanes in mold assembly 40.

According to some embodiments, the semi-permeable membrane of intermediate portion 36 includes at least one of fabric and paper. For example, the semi-permeable membrane may include flexible filter paper (e.g., a phenolic-impregnated filter paper) or an elastic fabric such as SPANDEX®. According to some embodiments, the semi-permeable membrane may be supported in mold assembly 40 via a frame structure, such as, for example, a spring-wire cage, and the method may include supporting intermediate portion 36 via the frame structure, so that intermediate portion 36 substantially maintains a circular shape as the first and second polyurethanes are supplied to mold assembly 40.

INDUSTRIAL APPLICABILITY

The molded tires disclosed herein may be used with any machines, including self-propelled vehicles or vehicles intended to be pushed or pulled by another machine. According to some embodiments, the molded tires may be non-pneumatic tires. According to some embodiments, the molded tires may include a tread portion and a support structure coupled to the tread portion, wherein the tread portion is formed from a material having different characteristics than the material forming the support structure. For example, the tread portion may be formed from a first polyurethane material having first material characteristics, and the support structure may be formed from a second polyurethane having second material characteristics that are different than the first material characteristics. This may facilitate tailoring of the material characteristics of the tread portion and the support structure to characteristics that are desirable for the respective tread portion and support structure. For example, it may be desirable for the tread portion to provide superior cut-resistance, wear-resistance, and/or traction, while in contrast, it may be desirable for the support structure to provide the desired load support and cushioning for the tire. By being able to select materials having the desired characteristics for each portion of the tire, it may be possible to provide a tire having a desired combination of performance characteristics not achievable with a single material.

In addition, the methods for forming a molded tire disclosed herein may result in a superior bond between the tread portion and the support structure. For example, the polyurethane of the tread portion may be chemically bonded (e.g., covalently bonded) to the polyurethane of the support structure, even though the two materials may have different characteristics. As a result, separation of the material of the tread portion from the material of the support structure may be prevented or reduced, resulting in a tire having superior durability and an increased service life.

It will be apparent to those skilled in the art that various modifications and variations can be made to the exemplary disclosed tires and methods of forming molded tires. Other embodiments will be apparent to those skilled in the art from consideration of the specification and practice of the exemplary disclosed embodiments. It is intended that the specification and examples be considered as exemplary only, with a true scope being indicated by the following claims and their equivalents.

What is claimed is:

1. A molded tire comprising:
   a support structure having an inner circumferential portion and an outer circumferential portion, the inner circumferential portion being configured to be associated with a hub;
   a tread portion associated with the outer circumferential portion of the support structure; and
   an intermediate portion coupling the tread portion and the outer circumferential portion to one another,
   wherein the tread portion is formed from a first polyurethane having first material characteristics,
   wherein the support structure is formed from a second polyurethane having second material characteristics different than the first material characteristics, and
   wherein the intermediate portion includes a semi-permeable membrane configured to permit chemical bonding between the first polyurethane and the second polyurethane.

2. The molded tire of claim 1, wherein the intermediate portion differs in color from at least one of the support structure and the tread portion.

3. The molded tire of claim 1, wherein the second polyurethane is stiffer than the first polyurethane, and wherein the first polyurethane is more cut-resistant and has a higher coefficient of friction than the second polyurethane.

4. The molded tire of claim 1, wherein the tread portion has a Shore hardness ranging from about 60 A to about 60 D, and the support structure has a Shore hardness ranging from about 80 A to about 95 A.

5. A molded tire comprising:
   a support structure having an inner circumferential portion and an outer circumferential portion, the inner circumferential portion being configured to be associated with a hub; and
   a tread portion coupled to the outer circumferential portion of the support structure,
   wherein the tread portion is formed from a first polyurethane having first material characteristics,
   wherein the support structure is formed from a second polyurethane having second material characteristics different than the first material characteristics,
   wherein the tire further includes an intermediate portion coupling the tread portion and the outer circumferential portion to one another,
   wherein the intermediate portion is formed from a third polyurethane,
   wherein the third polyurethane is from 50% to 90% stoichiometric prior to curing,
   wherein the tread portion has a Shore hardness ranging from about 60 A to about 60 D, and the support structure has a Shore hardness ranging from about 80 A to about 95 A, and
   wherein the second polyurethane is stiffer than the first polyurethane, and wherein the first polyurethane is more cut-resistant and has a higher coefficient of friction than the second polyurethane.

6. The molded tire of claim 5, wherein the intermediate portion differs in color from at least one of the support structure and the tread portion.

* * * * *